United States Patent
Andres et al.

(10) Patent No.: US 11,021,171 B2
(45) Date of Patent: Jun. 1, 2021

(54) DRIVING STATE WITHIN A DRIVING ENVIRONMENT THAT INCLUDES AUTONOMOUS AND SEMI-AUTONOMOUS VEHICLES

(71) Applicant: International Business Machines Corporation, Armonk, NY (US)

(72) Inventors: Josh Andres, Melbourne (AU); John Wagner, Carlton (AU); Timothy M. Lynar, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/153,963

(22) Filed: Oct. 8, 2018

(65) Prior Publication Data
US 2020/0108840 A1 Apr. 9, 2020

(51) Int. Cl.
*B60W 30/095* (2012.01)
*B60W 40/09* (2012.01)
(Continued)

(52) U.S. Cl.
CPC .......... *B60W 50/14* (2013.01); *B60W 30/095* (2013.01); *B60W 40/09* (2013.01);
(Continued)

(58) Field of Classification Search
CPC .......... G08G 1/16; G08G 1/161; G08G 1/164; G08G 1/166; G08G 1/20; G08G 1/00; G08G 1/0129; G08G 1/0133; G08G 1/0137; G08G 1/01141; B60W 40/02; B60W 40/09; B60W 40/10; B60W 2540/30; B60W 2550/12; B60W 2750/30; B60W 2040/0872; B60W 2556/65; G07C 5/008; G05D 1/0088; G06Q 40/08; G06Q 1/0104; G06K 9/00845
(Continued)

(56) References Cited

U.S. PATENT DOCUMENTS 8,311,858 B2 * 11/2012 Everett .................. G07C 5/008
705/4
8,892,451 B2 * 11/2014 Everett .............. G06Q 10/0833
705/4

(Continued)

FOREIGN PATENT DOCUMENTS

WO 2016028228 A1 2/2016

OTHER PUBLICATIONS

Project Based Learning: Predicting Bitcoin Prices using Deep Learning; S. Yogeshwaran;Maninder Jeet Kaur;Piyush Maheshwari; 2019 IEEE Global Engineering Education Conference (EDUCON); IEEE Conference Paper. (Year: 2019).*

(Continued)

*Primary Examiner* — Cuong H Nguyen

(57) ABSTRACT

An example operation may include one or more of collecting a set of driving data, estimating, from the set of driving data, one or more states that are predictive of an elevated driving risk of an adverse event endangering at least one of a driver, a vehicle's occupants or a vehicle's cargo, determining, from the one or more estimated states, an existence of an elevated driving risk, and alerting at least one of the vehicle, driver or the vehicle's occupants to the existence of the elevated driving risk.

15 Claims, 13 Drawing Sheets

(51) Int. Cl.
B60W 50/14 (2020.01)
G05D 1/00 (2006.01)
G06K 9/00 (2006.01)
B60W 40/08 (2012.01)
G07C 5/00 (2006.01)
G06Q 40/08 (2012.01)

(52) U.S. Cl.
CPC ....... G05D 1/0088 (2013.01); G06K 9/00845 (2013.01); B60W 2040/0818 (2013.01); B60W 2050/143 (2013.01); G05D 2201/0213 (2013.01); G06Q 40/08 (2013.01); G07C 5/008 (2013.01)

(58) Field of Classification Search
USPC .................................................. 701/23, 414
See application file for complete search history.

(56) References Cited

U.S. PATENT DOCUMENTS

| | | | |
|---|---|---|---|
| 9,682,653 | B2 | 6/2017 | Oh et al. |
| 10,304,139 | B2* | 5/2019 | Bowne .................... G01S 19/13 |
| 10,373,259 | B1* | 8/2019 | Konrardy ............... G06Q 40/00 |
| 2011/0161116 | A1* | 6/2011 | Peak ....................... G01C 21/36 705/4 |
| 2015/0046197 | A1 | 2/2015 | Peng et al. |
| 2015/0092056 | A1 | 4/2015 | Rau et al. |
| 2015/0170289 | A1* | 6/2015 | Bowne .................... G07C 5/08 705/4 |
| 2016/0139598 | A1 | 5/2016 | Ichikawa et al. |
| 2016/0167652 | A1 | 6/2016 | Slusar |
| 2017/0278400 | A1 | 9/2017 | Ferguson |
| 2017/0372431 | A1* | 12/2017 | Perl ........................ G07C 5/008 |
| 2018/0061237 | A1* | 3/2018 | Erickson ............. G08G 1/0141 |
| 2018/0174449 | A1* | 6/2018 | Nguyen ............... G08G 1/0104 |
| 2020/0226853 | A1* | 7/2020 | Ahmed ................. H04L 9/0618 |
| 2020/0241530 | A1* | 7/2020 | Caveney .............. G05D 1/0088 |
| 2020/0273024 | A1* | 8/2020 | Gorilovsky ............. G06Q 50/06 |
| 2020/0294129 | A1* | 9/2020 | Cella ........................ G06N 5/04 |
| 2020/0311474 | A1* | 10/2020 | Toyoda .............. G06K 9/00664 |
| 2020/0357075 | A1* | 11/2020 | Dahl ...................... G06Q 40/08 |
| 2020/0387965 | A1* | 12/2020 | Cella ....................... G06F 16/27 |
| 2020/0387966 | A1* | 12/2020 | Cella ................. G06Q 30/0206 |

OTHER PUBLICATIONS

Predicting Global Computing Power of Blockchain Using Cryptocurrency Prices; Guangcheng Li;Qinglin Zhao;Mengfei Song; Daidong Du;Jianwen Yuan;Xuanhui Chen;Hong Liang; 2019 International Conference on Machine Learning and Cybernetics (ICMLC); IEEE Conference Paper. (Year: 2019).*

C2P2: A Collective Cryptocurrency Up/Down Price Prediction Engine; Chongyang Bai;Thomas White;Linda Xiao;Venkatramanan Siva Subrahmanian;Ziheng Zhou; 2019 IEEE International Conference on Blockchain (Blockchain); IEEE Conference Paper. (Year: 2019).*

Systematic Erudition of Bitcoin Price Prediction using Machine Learning Techniques; Prachi Vivek Rane;Sudhir N. Dhage; 2019 5th International Conference on Advanced Computing & Communication Systems (ICACCS); IEEE Conference Paper. (Year: 2019).*

Performance Evaluation of Machine Learning Algorithms for Bitcoin Price Prediction; H Kavitha;Uttam Kumar Sinha;Surbhi S Jain 2020 Fourth International Conference on Inventive Systems and Control (ICISC); IEEE Conference Paper. (Year: 2020).*

Performance Evaluation of Machine Learning Algorithms in Handwritten Digits Recognition; Soufiane HAMIDA;Bouchaib Cherradi;Abdelhadi Raihani;Hassan Ouajji; 2019 1st International Conference on Smart Systems and Data Science (ICSSD); Conference Paper. (Year: 2019).*

Anonymous, "Method and framework for vehicle assisted control system"; IBM; ip.com; Feb. 8, 2017.

* cited by examiner

640

DRIVING STATE WITHIN A DRIVING ENVIRONMENT THAT INCLUDES AUTONOMOUS AND SEMI-AUTONOMOUS VEHICLES

TECHNICAL FIELD

This application generally relates to a system for assisting driving, and more particularly, to driving state within a driving environment that includes autonomous and semi-autonomous vehicles.

BACKGROUND

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

A critical issue with both human drivers, as well as semi-autonomous and autonomous driving is that it is not yet reliable and safe. It is conceivable in the future that semi-autonomous and autonomous vehicles will be operated alongside human-operated, non-autonomous vehicles. What is required is an improved system for managing drivers and vehicles for enhancing safety.

SUMMARY

One example embodiment provides a system that includes one or more driving data sources that are programmed to collect driving data, at least one database remote from the one or more driving data sources that is configured to perform one or more of receive the driving data from the one or more driving sources via a communications network, at least one risk determination system programmed to process the driving data to estimate, from the driving data, one or more states that are predictive of an elevated driving risk of an adverse event that endangers at least one of a driver, a vehicle's occupants or a vehicle's cargo, determine, from the one or more estimated states, an existence of an elevated driving risk, and provide an alert of an elevated driving risk to at least one alert device.

Another example embodiment provides a method that includes one or more of collecting a set of driving data from a plurality of distributed sources into at least one database, estimating, by at least one processor programmed to process the set of driving data, one or more states that are predictive of an elevated driving risk of an adverse event endangering at least one of a driver, a vehicle's occupants or a vehicle's cargo, determining, from the one or more estimated states, an existence of an elevated driving risk, and alerting at least one of the vehicle, driver or the vehicle's occupants to the existence of the elevated driving risk.

A further example embodiment provides a non-transitory computer readable medium comprising instructions, that when read by a processor, cause the processor to perform one or more of collecting a set of driving data from a plurality of distributed sources into at least one database, estimating, from the set of driving data, one or more states that are predictive of an elevated driving risk of an adverse event endangering at least one of a driver, a vehicle's occupants or a vehicle's cargo, determining, from the one or more estimated states, an existence of an elevated driving risk, and alerting at least one of the vehicle, driver or the vehicle's occupants to the existence of the elevated driving risk.

DETAILED DESCRIPTION

Figure 1:
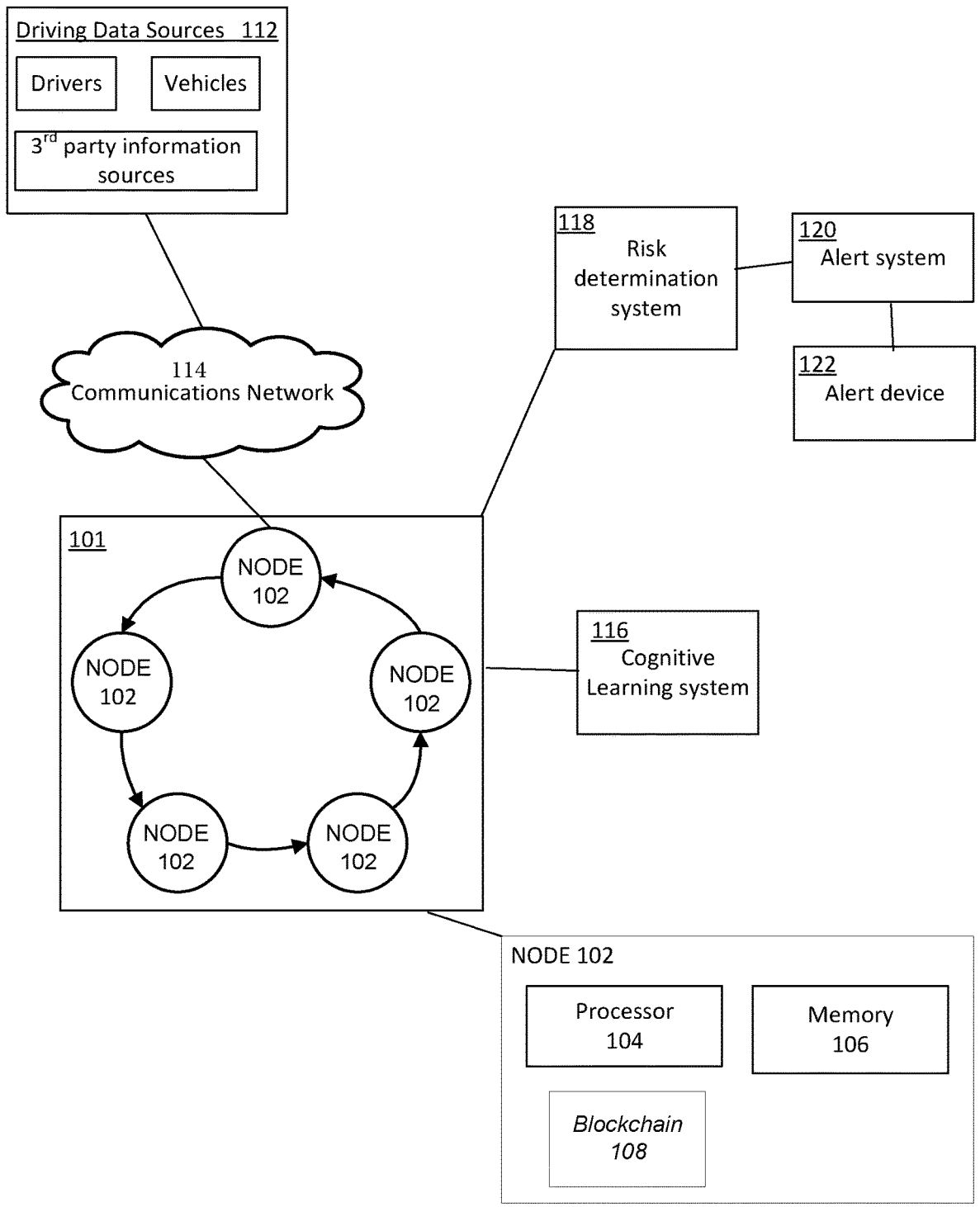
FIG. 1 illustrates a network diagram of a system for predicting driving risk, including a database, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide enhancement of driver and vehicle safety through the determination and notification of elevated risks of adverse events. Example embodiments may make use of the benefits of blockchain networks or similar decentralized databases for managing data from distributed and disparate sources.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic, tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Some benefits of the instant solutions described and depicted herein include the ability to collect driving related data from a variety of sources and amalgamate the data into a database for subsequent processing into an estimation of driving risk. The solutions are able to use an Internet of Things (IoT) approach where distributed devices are able to record driving related data and provide the data into the database. Tampering of the data may be prevented by the immutable properties of a blockchain, from which the data can then be extracted for subsequent processing. Smart contracts can be used to reliably generate driving risk assessments and, where necessary, provide alerts to drivers or vehicles via IoT devices.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

Through the blockchain system described herein, distributed devices that are able to record driving related data are able to contribute the data, in relatively real-time where required, to database. Smart contracts can then execute on the data, again in real-time if required, to determine if an elevated risk condition exists and if so, to take action to alleviate the risk, such as notifying a driver or vehicle.

The embodiments to be described herein below may make use of some or all of the following terminology. Definitions of terms are provided by way of example only to aid in a clear and concise description of the specific example embodiments. Rigid adherence to these definitions is not required for all embodiments. The person skilled in the art will readily understand that alternative definitions of the terms may be applicable for other embodiments that remain within the broadest scope of the present disclosure.

Definitions:

Driver

A human operating a non-autonomous vehicle, a system assisting in the operation of a semi-autonomous vehicle or a system controlling the operation of an autonomous vehicle.

Occupants

Any human occupant of a Vehicle. Occupant data may include, without limitation, age and/or status of occupant which may include sensor data such as has seatbelt on, weight, has car seat.

Contents/Cargo

Any contents carried in the vehicle, this is particularly relevant for vehicles carrying valuable equipment, materials, and even organs for transplant.

Vehicle

A human operated vehicle, semi-autonomous vehicle whose operation is assisted by a system specifically designed to assist in its operation or an autonomous vehicle whose operation is controlled by a system specifically designed to control the vehicle. Vehicles include, but are not limited to, passenger vehicles or public or commercial vehicles transporting humans or cargo (e.g. long or short haul truckers, busses, trains, trams, taxis, Ubers, etc.).

Data Provider

Any vehicle or device whose owner or driver provide vehicle operation and maintenance data to the system. Some data providers may opt in to providing data to the system, whereas others may be mandated by law to do so.

Driving Data

Any data regarding driving decisions, driving quality, driving patterns and vehicle maintenance.

Adverse Event

Any event leading to vehicle damage, injury to human occupants or loss of or damage to vehicle cargo.

Driving Risk

Chance of vehicle damage, injury to human occupants or loss of or damage to vehicle cargo.

States

Any condition of a Driver or Vehicle predictive of a given Driving Risk, particularly an elevated Driving Risk.

Alert Device

An IoT-enabled device indicator worn by the vehicle Occupants or installed in the vehicle.

Alert System

A system that transmits a predicted Risk to an Alert Device or an electronic signal sent to a system assisting in the operation of a semi-autonomous vehicle or a system controlling the operation of an autonomous vehicle.

A system for processing information for the purpose of offering a safer driving environment through the assessment of risk factors pertaining to driver, vehicle and traffic data to calculate a risk profile is depicted in FIG. 1. The system 100 includes a database that is able to receive and store data from a plurality of sources. In one embodiment, the database system is implemented as a blockchain network 101 including a plurality of peer nodes. Each peer node 102 includes at least one processor 104 and an operatively associated memory 106. The memory 106 may include memory for one or more instruction sets, applications, software etc. as well as memory for storing a blockchain 108 and a state database or ledger 110. The memory 106 may also include random access memory for executing the one or more instruction sets, applications, software etc. to perform one or more functions of the blockchain network. The memory 106 may also include memory for storing data including a blockchain and a state ledger database.

The system 100 includes various driving data sources 112 that are each able to contribute driving related data to the database maintained by the blockchain network 101. The data sources 112 communicate with nodes 102 of the blockchain network 102 via a communications network 114 such as the internet. Communications may be via any suitable communications protocols. The information sources may include driver specific data, vehicle specific data, or other driving environment data, such as weather data, traffic, etc.

The system 100 includes a cognitive learning system 116 that is able to process driving data within the blockchain to determine driving states and further to determine sets or sequences of states that are indicative of an elevated risk of an adverse driving event, such as an event that may cause damage to a vehicle and/or injury to a driver or occupant.

The cognitive learning system may be able to store learning data, such as states and risk indicators in the blockchain of the blockchain network.

The system further includes a risk determination system 118 that is able to extract current driving data from the blockchain network and determine the existence of a predicted risk of an adverse event. The blockchain may make reference to learning examples and data stored in the blockchain network by the cognitive learning system 116. Where an elevated driving risk exists, the risk determination system 118 may activate an alert system 120 that sends an alert to one or more drivers, occupants or vehicles that may be affected by the elevated risk condition. The alert may be a discernable alarm, such as a light, sound or vibration issue by an alert device 122. The risk determination system 118 may determine risk states pertaining to specific drivers, occupants or vehicles or may be able to generate risks states more generally and issue alerts to multiple drivers, vehicles or occupants.

The risk determination system 118 may include one or more processors and one or more memories. The processors may be programmed to periodically process the driving data in the database to estimate one or more driving states and further process the estimate states to determine whether one or more states or any set or sequence of states is indicative of an elevated driving risk for a particular driver, vehicle, set of drivers or set of vehicles.

The driving data sources may include vehicle related sources. For example, vehicle sensors may measure or record vehicle performance, location, speed, driving patterns, driving decisions, driving quality, vehicle maintenance, number of occupants, seat-belt status, etc. The vehicle sensors may contribute vehicle specific data to the database.

The driving data sources may include driver related sources. For example, driver sensors worn by the driver may be able to detect driver parameters including physical driver parameters such as heart rate etc. Other driver data sensors, worn or otherwise, may be able to measure or estimate cognitive function, emotional states, etc.

The driving data sources may include other environmental data sources that contribute data related to the driving environment. Environmental data may include weather related data, road and traffic related data, accident or roadworks related data, etc.

Each data source may be configured and programmed to contribute data to the database. A blockchain implementation of the database may have advantages because it allows distributed sources of data to contribute their respective data via any processing node that the data source is able to communicate with. Furthermore, a blockchain or similar shared ledger has particular advantages for storing the data because there is no apparent central authority that is not also an ecosystem participant. The immutability offered by a blockchain can prevent individuals or companies from tampering with records in order, for example, to sanitize a driver's or company's image (e.g., for insurance purposes), or limit their liability in the case of an accident.

The ecosystem participants have no basis for trusting one another, yet must work together to ensure the safe and effective transport of people and cargo on shared roadways. All ecosystem participants both collaborate and compete in transporting people and cargo, and share the risk and rewards of doing so, hence it is reasonable to expect all participants to work together ensuring the completeness and integrity of the shared ledger.

The risk determination system 118 processes information for the purpose of computing and forecasting a vehicle's and route's risk profile through the assessment of risk factors pertaining to driving and traffic data. Through the compiling of a sequence of States that are predictive of an elevated Driving Risk of an Adverse Event, the set of driving data predictors, as determined for example by the cognitive learning system, are used to estimate an elevated Driving Risk endangering a Driver, vehicle's occupants or cargo. Having predicted the existence of an elevated risk level, and the Driver or vehicle's occupants are alerted to the existence of the Risk by using an Alert System to send a perceivable alert to the driver or vehicle's occupants, or an electronic signal to the semi- or autonomous vehicle operation system.

In one embodiment, the alert device 122 may include at least one device that is installed in a vehicle. In one embodiment, the risk indicating device may be a wearable device that can be worn by a driver or occupant. The risk determination device may include an alert source that is able to emit or issue a perceivable alert such as a light source, a sound source, a vibration source, or any combination thereof. The perceivable alerts may be transmitted through a set of standard interfaces provided for each risk indicator according to a translation interface for each indicator.

The risk determination system may make use of the cognitive learning system. Driver states may be categorized using unsupervised learning from driver data, including video data and personal devices. The data is collected and analyzed into driver states. The states are further analyzed using supervised learning to determine the sequences of driver states that predict an accident event and/or a driver injury event.

By way of example, a vehicle undergoing frequent lane changes at a particular speed in a particular density of traffic may not be an indicator of elevated risk. However, a vehicle travelling at the same speed and same frequency of lane changes but at a higher traffic density may be indicative of a higher risk of accident or injury. Likewise, if the driver state indicates a lower level of cognitive ability due to some sensible or measurable factor, then the total sequence of states (speed, driving pattern, cognitive ability) may be indicative of an elevated accident risk.

The risk determination system may periodically process the data of the database, e.g. shared ledger, into a set of current states. If the set of current states are indicative of an elevated driving risk, as determined by comparison with learning models, then the risk determination system may send an alert to a relevant alert device.

The risk determination system may be specific to a particular driver or vehicle and may focus primarily on driving data related to that driver or vehicle. However, the risk determination system may take account of driving data related to other current road users. Thus, if a particular driver or vehicle is assessed as being at an elevated risk of an accident, the risk determination system may determine nearby vehicles and drivers that are likely to encounter that driver or vehicle and send alerts to the affected drivers or vehicles accordingly.

The alert system may include an ability to communicate an instruction to a vehicle operated by the driver to modify vehicle operation as a result of the predicted elevated risk.

The risk determination system may determine a respective driver risk profile and vehicle use profile for each driver in a set of drivers and determining one or more areas of training for at least one driver in the set that is appropriate to the driver risk profile and vehicle use profile for the at least one driver.

In one embodiment, the system is vehicle-centric. That is, the system includes one or more servers having a processor and a Vehicle's Driving Risk profile and Adverse Event predictor that predicts a Risk through consideration of categorized information on Driver States obtained by unsupervised learning and supervised learning. The vehicle contributes driving data related to the vehicle and the driver to the server. The server periodically recalculates the vehicle's driving risk profile based on the vehicle and driver data, and potentially, driving environment data contributed from other sources, including other vehicles. When the server determines the existence of a predicted risk of an adverse event and an Occupant warning, the server may send an alert signal to the vehicle, driver of the vehicle or occupant of the vehicle. The server may send the alert to any vehicle, driver, or vehicle occupant that is exposed to the predicted elevate risk. Other exposed drivers may be determined based on proximity, forecast route information for multiple vehicles, timestamps, etc.

In addition to providing elevated risk indications to alert devices of the vehicle or vehicle occupants, elevated risk indicators may also be stored as data in the blockchain. Such data may be used in auditing and analyzing driver behavior.

Figure 2A:
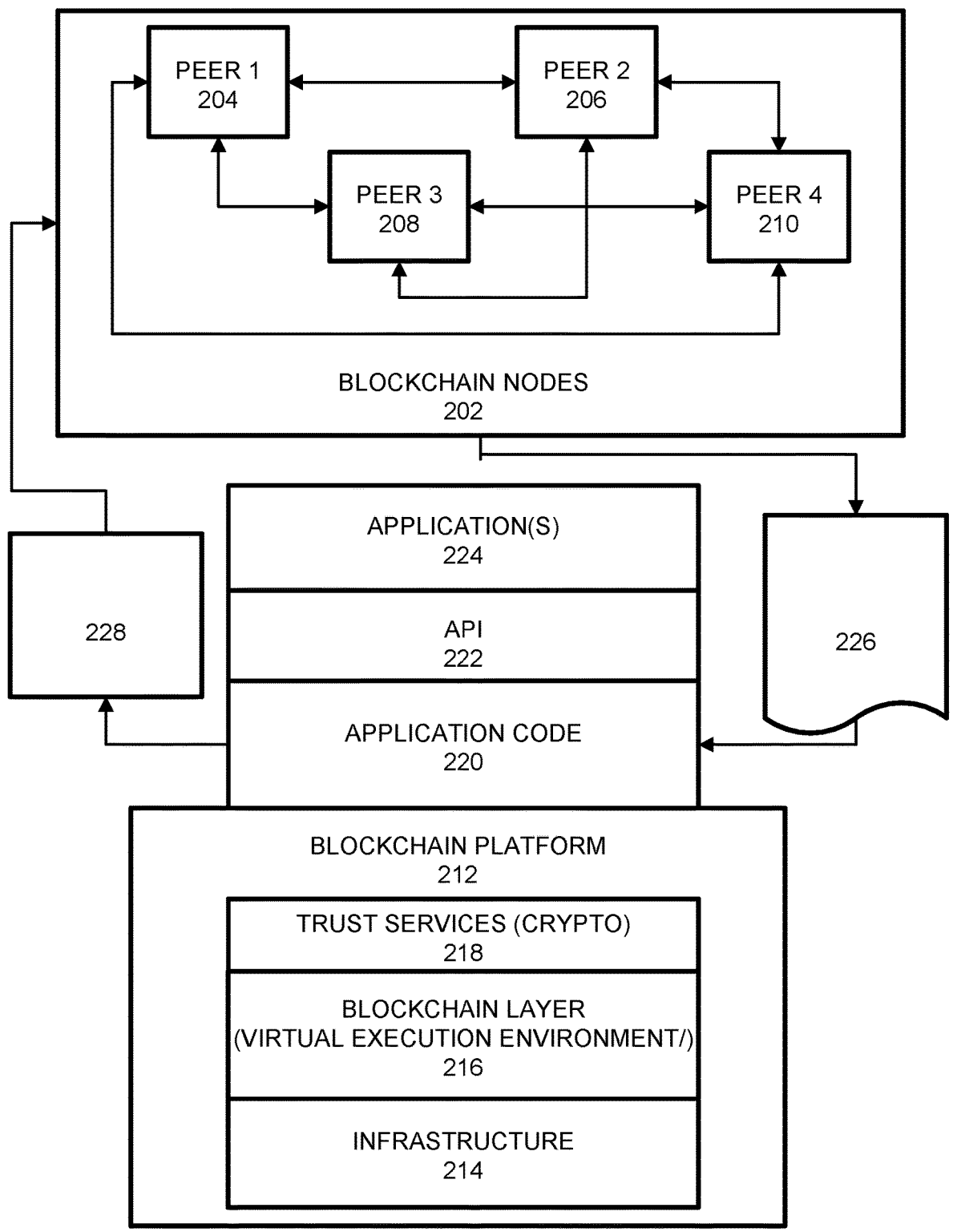
FIG. 2A illustrates an example peer node configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the driving data information 226 may be processed by one or more processing entities (e.g., virtual machines) included in the blockchain layer 216. The result 228 may include a determination of one or more states and a sequence of states that is indicative of an elevate driving risk. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, driving data 226 is processed into a set of driving states that can be used for predicting an elevated risk of vehicle accident or occupant injury. Risk indications may be provided to one or more of the nodes 204-210 for storing in the blockchain as well as being provided to alert devices.

Figure 2B:
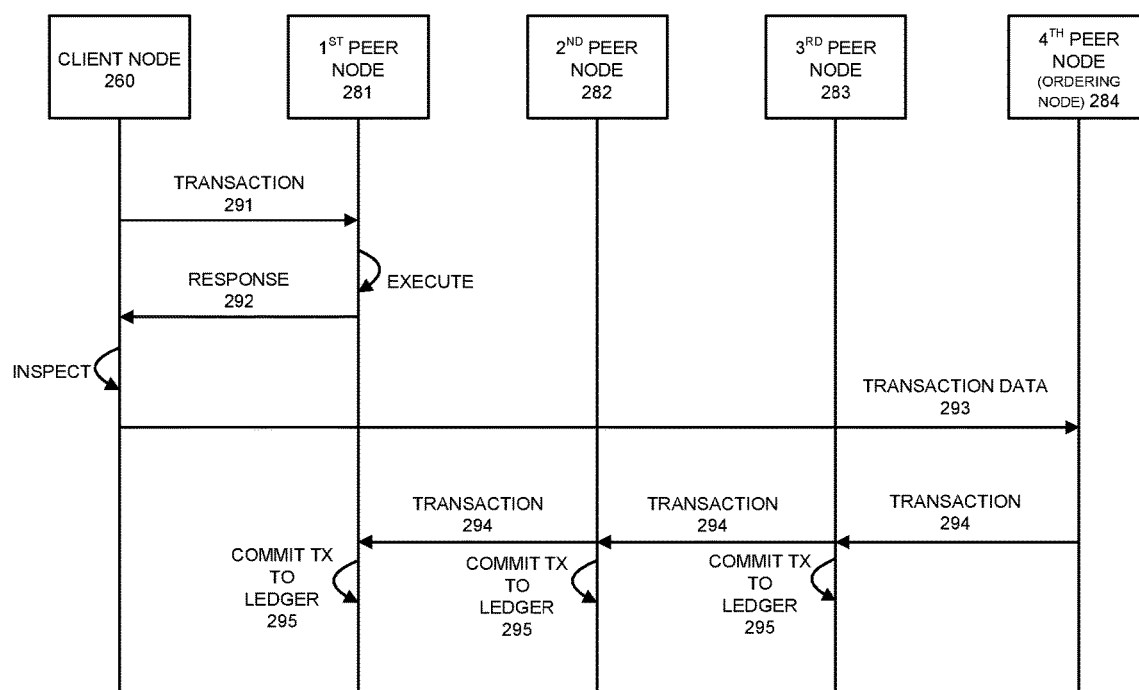
FIG. 2B illustrates a further peer node configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set).

The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
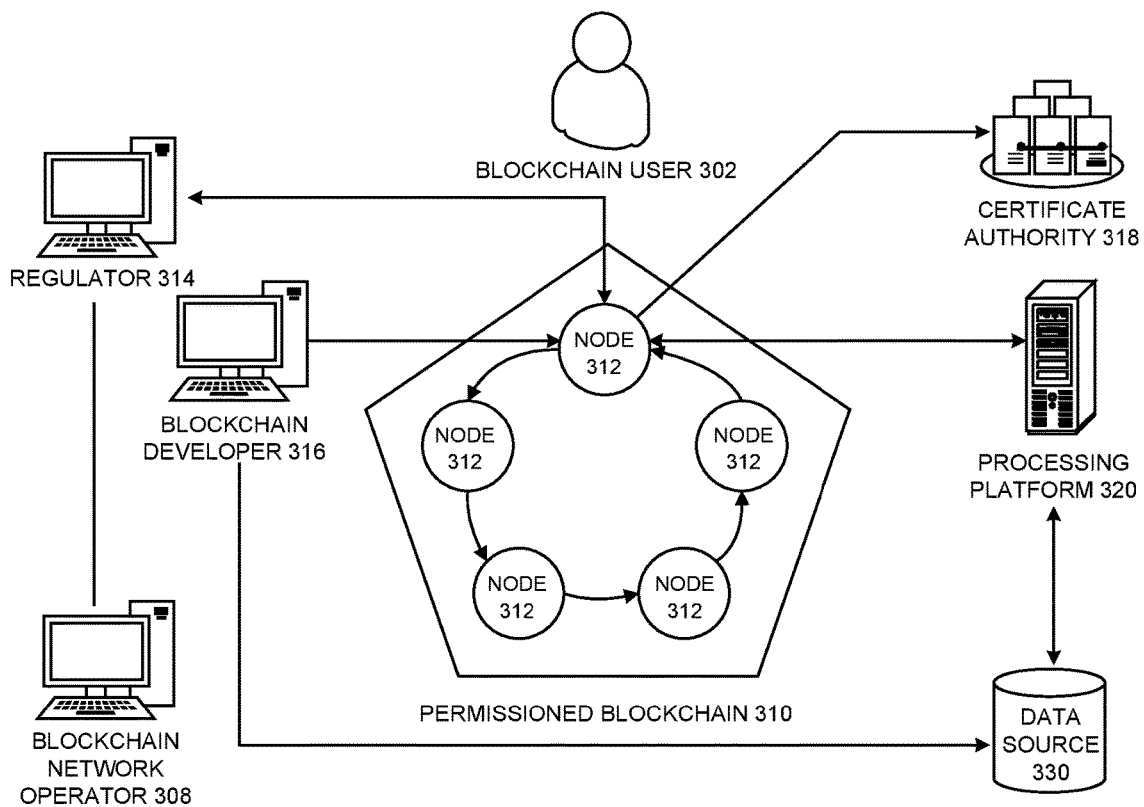
FIG. 3 illustrates a permissioned network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
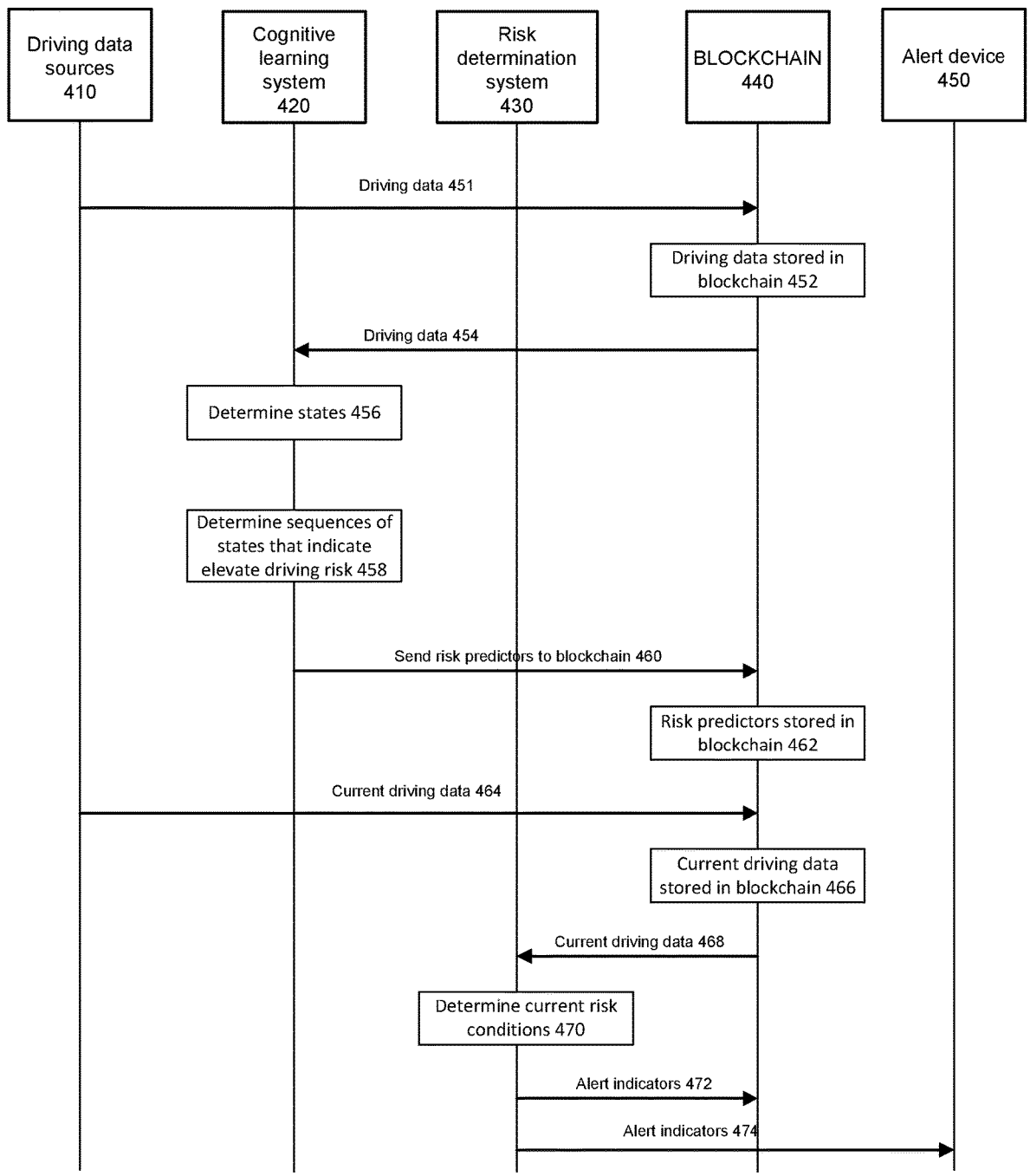
FIG. 4 illustrates a system messaging diagram, according to example embodiments.

FIG. 4 illustrates a system messaging diagram for performing driving risk assessment, according to example embodiments. Referring to FIG. 4, the system diagram 400 includes driving data sources 410, that may be any of the data sources described previously including, without limitation, driver sensors, vehicle sensors, 3rd party sources etc. The system diagram 400 also shows a cognitive learning system 420, risk determination system 430, blockchain network 440 and alert devices 450.

The driving data sources 410 contribute driving data 451 to the blockchain network 440 which is stored on the blockchain 452. The cognitive learning system 420 extracts driving data for learning purposes 454 and determines states indicated by the driving data 456 using learning principles, including unsupervised learning. The cognitive learning system 420 further processes the state data to determine risk predictors 458 indicated by the state data using supervised learning principles. The learning examples, state data and risk predictors may be contributed 460 to the blockchain network 440 and stored in the blockchain 462. These processes establish and the instantiate the system ready for use to predict current driving risk.

After instantiation, the driving sources 410 may contribute current driving data 464 to the blockchain network 440 which is stored in the blockchain 466. The risk determination system 430 extracts the current driving data 468 and applies the risk predictors to the current driving data to determine if states indicating an elevated risk condition exists 470.

Alerts for elevated risk conditions can be sent and stored in the blockchain 472 as well as being transmitted 474 to alert devices 450.

Figure 5:
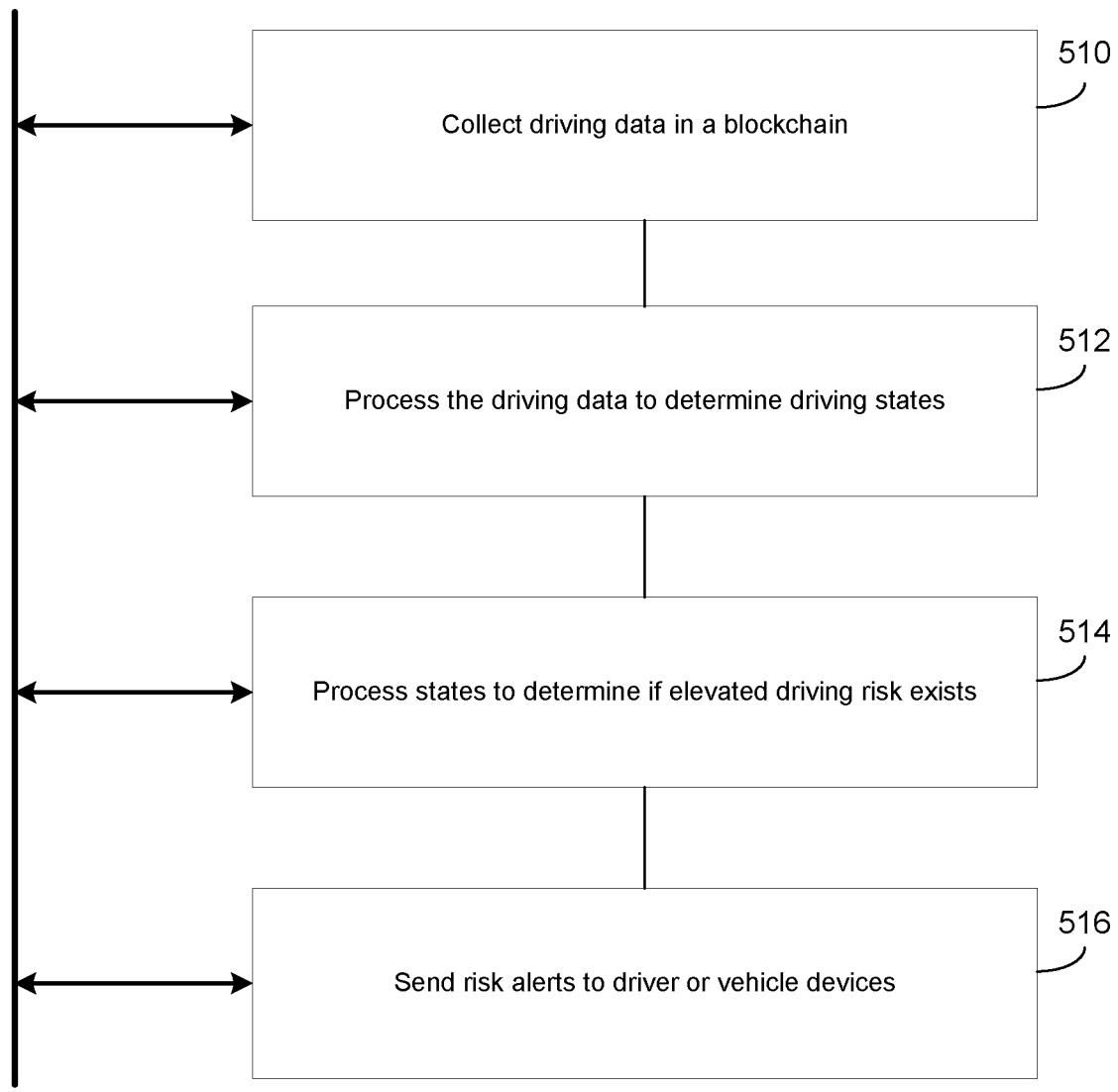
FIG. 5 illustrates a flow diagram, according to example embodiments.

FIG. 5 illustrates a flow diagram 500 of an example method of determining driving risk condition . . . in a blockchain, according to example embodiments. Referring to FIG. 5, the method 500 may include collecting a set driving data at step 510. At step 512, the driving data is used to estimate one or more states that may be predictive of an elevated driving risk of an adverse event endangering at least one of a driver, a vehicle's occupants or a vehicle's cargo. The estimated states and then processed to determine if an elevated driving risk exists (step 514) and any elevate driving risks are communicated as an alert to at least one of the Driver or the vehicle's occupants (step 516).

By way of a specific example, suppose Alan is a driver of a vehicle. Every-time he drives different data is collected about his driving, for example:
 eye movement
 speed adherence
 number of lane changes
 adherence to traffic signals
 acceleration and decelerations
 turns without signals and lane turning
 proximity to other vehicles
 weather changes as sensed by the vehicle and driving in this (driving in rain, vs driving in standard weather).

Every action is recorded while driving such as 'turns, accelerations'. These may be analyzed and sent as transactions to the ledger. Some data, such as speed, may be added periodically, e.g., every minute. Other data, such as lane changes etc. can be added as it occurs.

The driving risk may be computed periodically, e.g., every minute or so, but it could also be dependent on overall traffic density and speed. That is, the higher the density and speed, the more often the risk may be computed. Also, as the vehicles around the driver change (e.g., someone merges onto the highway near Alan), the system recomputes the risk.

The driving risk may be computed periodically, e.g., every minute or so, but it could also be dependent on overall traffic density and speed. That is, the higher the density and speed, the more often the risk may be computed. Also, as the vehicles around the driver change (e.g. someone merges onto the highway near Alan), the system recomputes the risk.

The present embodiments describe a system wherein driving and traffic data are collected to estimate a vehicle's risk profile. In some embodiments, the collection of data related to the operation of vehicles might become mandated by law. Alternatively, in the interest of public safety, owners of commercial vehicles might opt in to provide data in the interests of vehicle and cargo safety, and other drivers might opt-in to provide their own vehicle operation data to ensure the safety of themselves and others. In one specific embodiment, it could be envisaged that parents of teen-aged drivers would opt in in the interests of protecting their children and other occupants of their teen driver's vehicle. Users of the system benefit by forecasting their own risk of receiving harm but equally the risk of causing harm to others, by adding, for instance, data on cyclists, pedestrians and other vehicles.

The system may have application for auditing and traceability of vehicles as assets (public security and road planning).

Figure 6A:
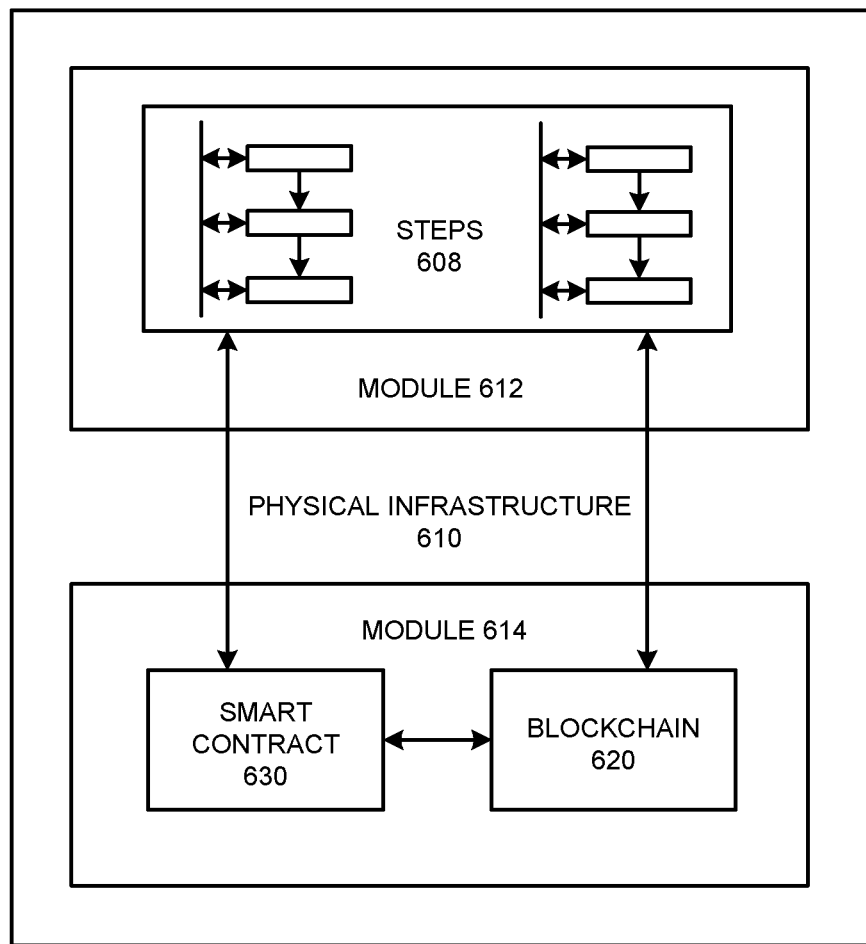
FIG. 6A illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
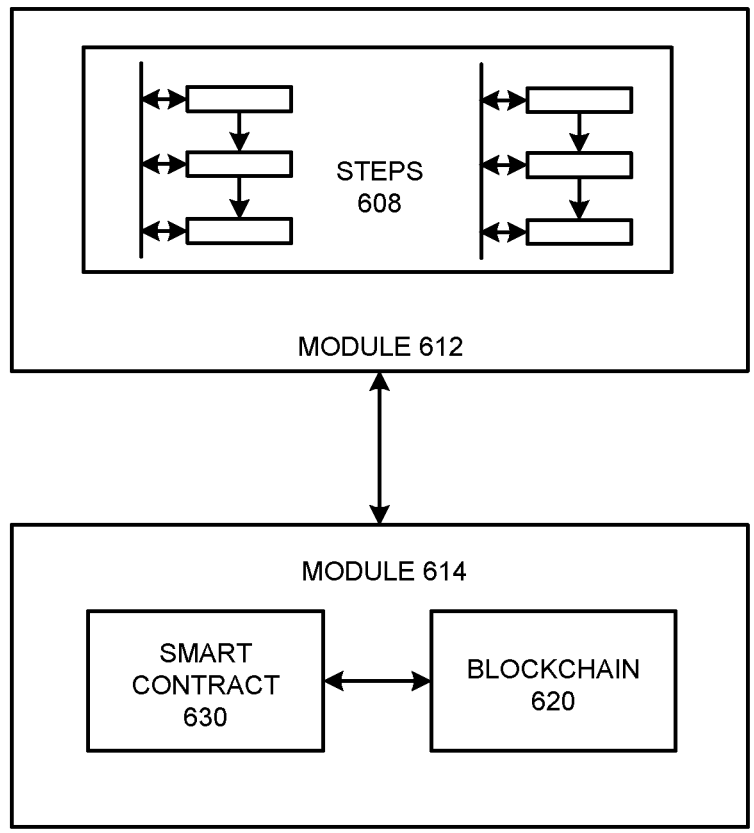
FIG. 6B illustrates a further example system configured to perform one or more operations described herein, according to example embodiments.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
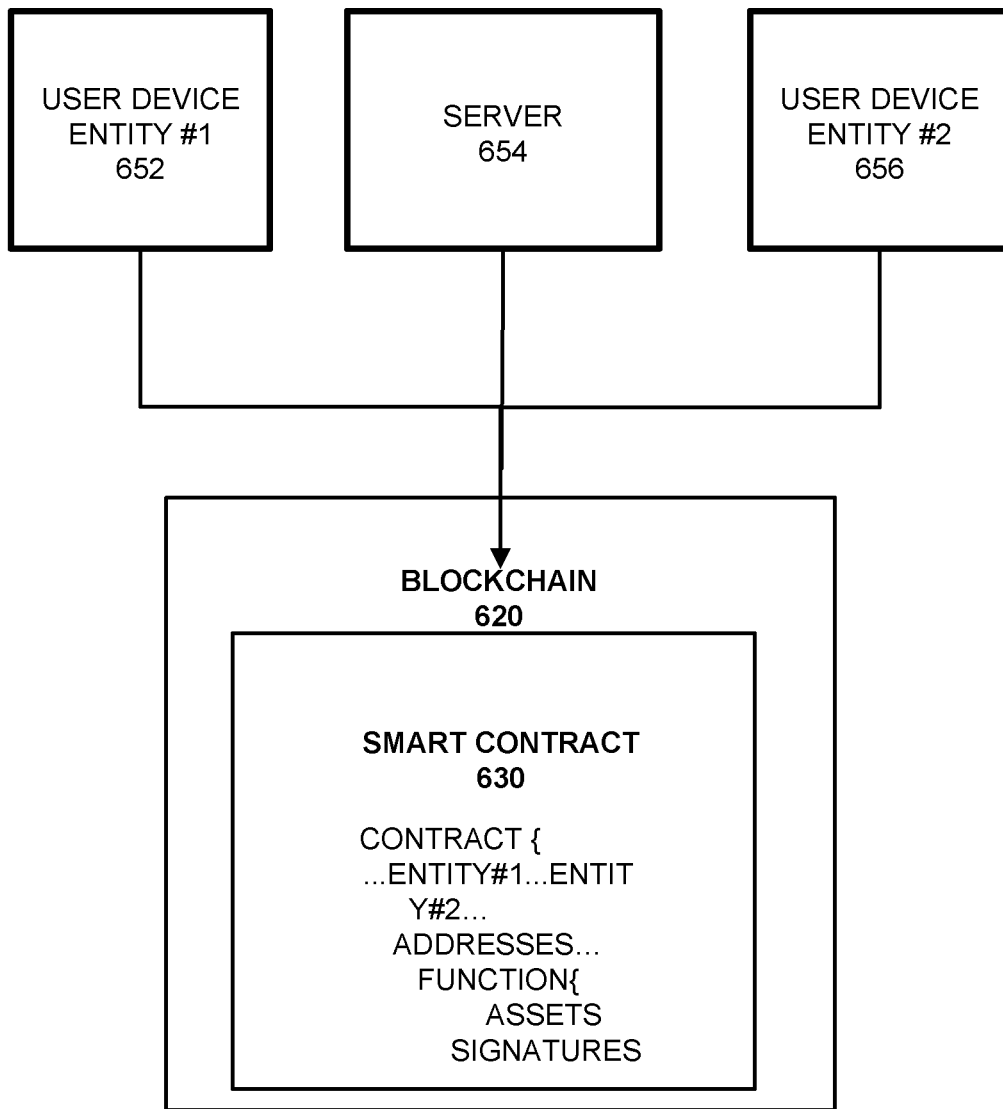
FIG. 6C illustrates a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
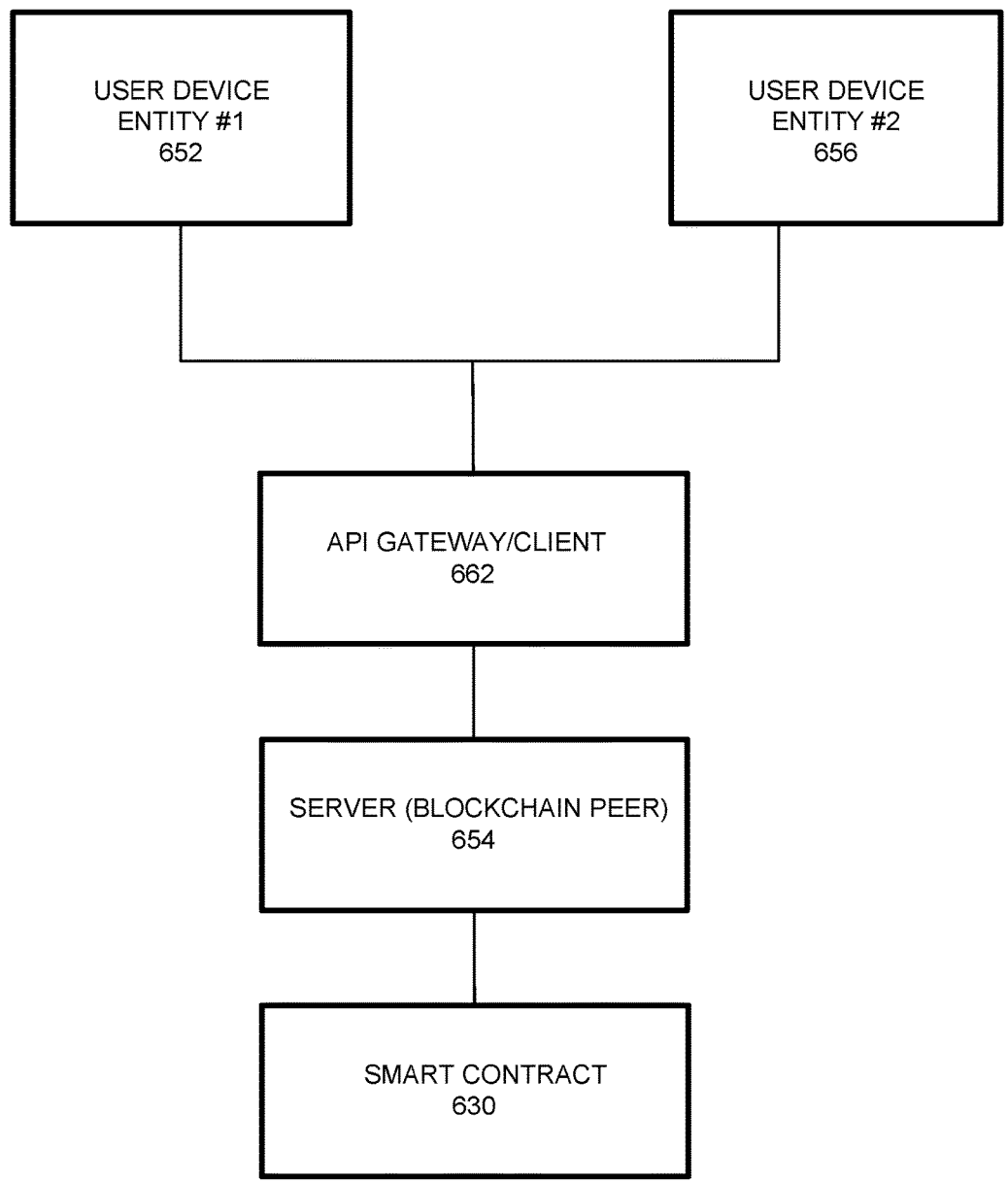
FIG. 6D illustrates another an additional example system, according to example embodiments.

FIG. 6D illustrates a common interface 660 for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 7A:
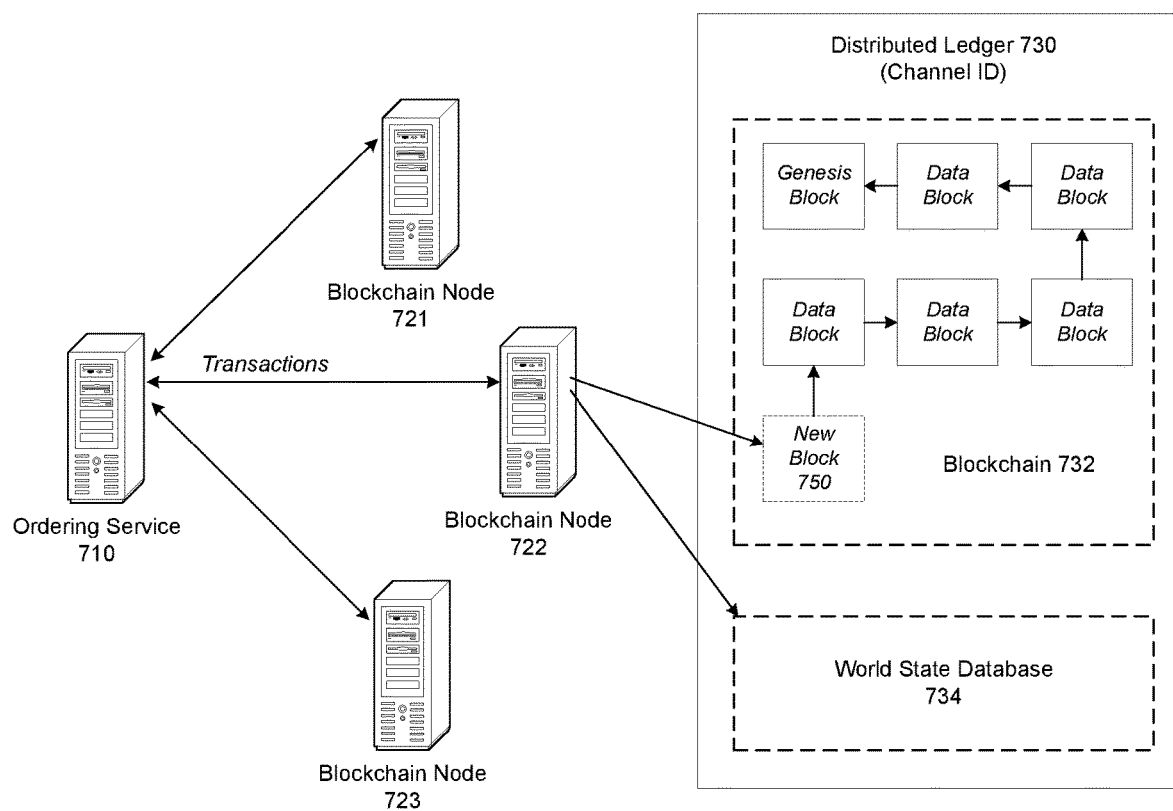
FIG. 7A illustrates a process of new data being added to a database, according to example embodiments.
Figure 7B:
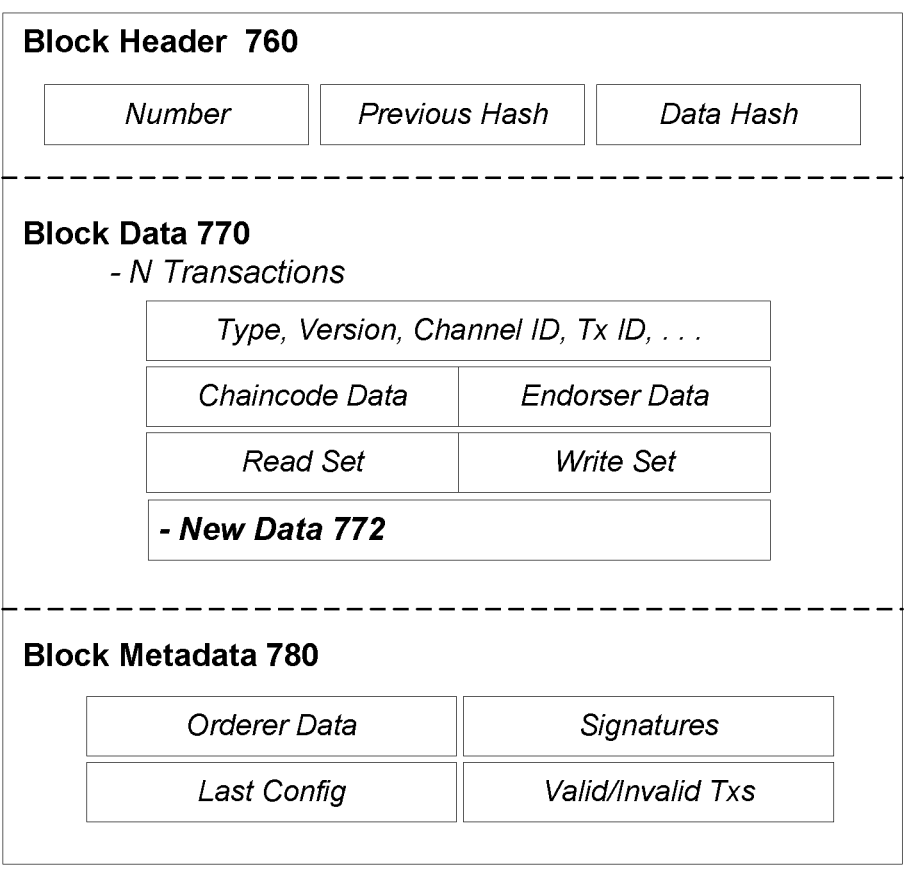
FIG. 7B illustrates contents a data block including the new data, according to example embodiments.

FIG. 7A illustrates a process 700 of a new block being added to a distributed ledger 730, according to example embodiments, and FIG. 7B illustrates contents of a block structure 750 for blockchain, according to example embodiments. Referring to FIG. 7A, clients (not shown) may submit transactions to blockchain nodes 721, 722, and/or 723. Clients may be instructions received from any source to enact activity on the blockchain 730. As an example, clients may be applications that act on behalf of a requester, such as a device, person or entity to propose transactions for the blockchain. The plurality of blockchain peers (e.g., blockchain nodes 721, 722, and 723) may maintain a state of the blockchain network and a copy of the distributed ledger 730. Different types of blockchain nodes/peers may be present in the blockchain network including endorsing peers which simulate and endorse transactions proposed by clients and committing peers which verify endorsements, validate transactions, and commit transactions to the distributed ledger 730. In this example, the blockchain nodes 721, 722, and 723 may perform the role of endorser node, committer node, or both.

The distributed ledger 730 includes a blockchain 732 which stores immutable, sequenced records in blocks, and a state database 734 (current world state) maintaining a current state of the blockchain 732. One distributed ledger 730 may exist per channel and each peer maintains its own copy of the distributed ledger 730 for each channel of which they are a member. The blockchain 732 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 732 are sequenced and cryptographically linked together preventing tampering with blockchain data without breaking the hash links. Furthermore, because of the links, the latest block in the blockchain 732 represents every transaction that has come before it. The blockchain 732 may be stored on a peer file system (local or attached storage), which supports an append-only blockchain workload.

The current state of the blockchain 732 and the distributed ledger 732 may be stored in the state database 734. Here, the current state data represents the latest values for all keys ever included in the chain transaction log of the blockchain 732. Chaincode invocations execute transactions against the current state in the state database 734. To make these chaincode interactions extremely efficient, the latest values of all keys are stored in the state database 734. The state database 734 may include an indexed view into the transaction log of the blockchain 732, it can therefore be regenerated from the chain at any time. The state database 734 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 722 is a committing peer that has received a new data block 750 for storage on blockchain 730.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 730. The architecture of the blockchain network may be designed such that the specific implementation of 'ordering' (e.g., Solo, Kafka, BFT, etc.) becomes a pluggable component.

Transactions are written to the distributed ledger 730 in a consistent order. The order of transactions is established to ensure that the updates to the state database 734 are valid when they are committed to the network. Unlike a cryptocurrency blockchain system (e.g., Bitcoin, etc.) where ordering occurs through the solving of a cryptographic puzzle, or mining, in this example the parties of the distributed ledger 730 may choose the ordering mechanism that best suits that network.

When the ordering service 710 initializes a new block 750, the new block 750 may be broadcast to committing peers (e.g., blockchain nodes 721, 722, and 723). In response, each committing peer validates the transaction within the new block 750 by checking to make sure that the read set and the write set still match the current world state in the state database 734. Specifically, the committing peer can determine whether the read data that existed when the endorsers simulated the transaction is identical to the current world state in the state database 734. When the committing peer validates the transaction, the transaction is written to the blockchain 732 on the distributed ledger 730, and the state database 734 is updated with the write data from the read-write set. If a transaction fails, that is, if the committing peer finds that the read-write set does not match the current world state in the state database 734, the transaction ordered into a block will still be included in that block, but it will be marked as invalid, and the state database 734 will not be updated.

Referring to FIG. 7B, a block 750 (also referred to as a data block) that is stored on the blockchain 732 of the distributed ledger 730 may include multiple data segments such as a block header 760, block data 770, and block metadata 780. It should be appreciated that the various depicted blocks and their contents, such as block 750 and its contents. shown in FIG. 7B are merely for purposes of example and are not meant to limit the scope of the example embodiments. In some cases, both the block header 760 and the block metadata 780 may be smaller than the block data 770 which stores transaction data, however this is not a requirement. The block 750 may store transactional information of N transactions (e.g., 100, 500, 1000, 2000, 3000, etc.) within the block data 770. The block 750 may also include a link to a previous block (e.g., on the blockchain 732 in FIG. 7A) within the block header 760. In particular, the block header 760 may include a hash of a previous block's header. The block header 760 may also include a unique block number, a hash of the block data 770 of the current block 750, and the like. The block number of the block 750 may be unique and assigned in an incremental/sequential order starting from zero. The first block in the blockchain may be referred to as a genesis block which includes information about the blockchain, its members, the data stored therein, etc.

The block data 770 may store transactional information of each transaction that is recorded within the block 750. For example, the transaction data may include one or more of a type of the transaction, a version, a timestamp, a channel ID of the distributed ledger 730, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In some embodiments, the block data 770 may also store data 772, such as driving data, driving states, risk determinations and alerts, etc. which adds additional information to the hash-linked chain of blocks in the blockchain 732. Accordingly, the data 772 can be stored in an immutable log of blocks on the distributed ledger 730. Some of the benefits of storing such data 772 are reflected in the various embodiments disclosed and depicted herein.

The block metadata 780 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 722) may add validity/invalidity information based on an endorsement policy, verification of read/write sets, and the like. The transaction filter may include a byte array of a size equal to the number of transactions in the block data 770 and a validation code identifying whether a transaction was valid/invalid.

Figure 8:
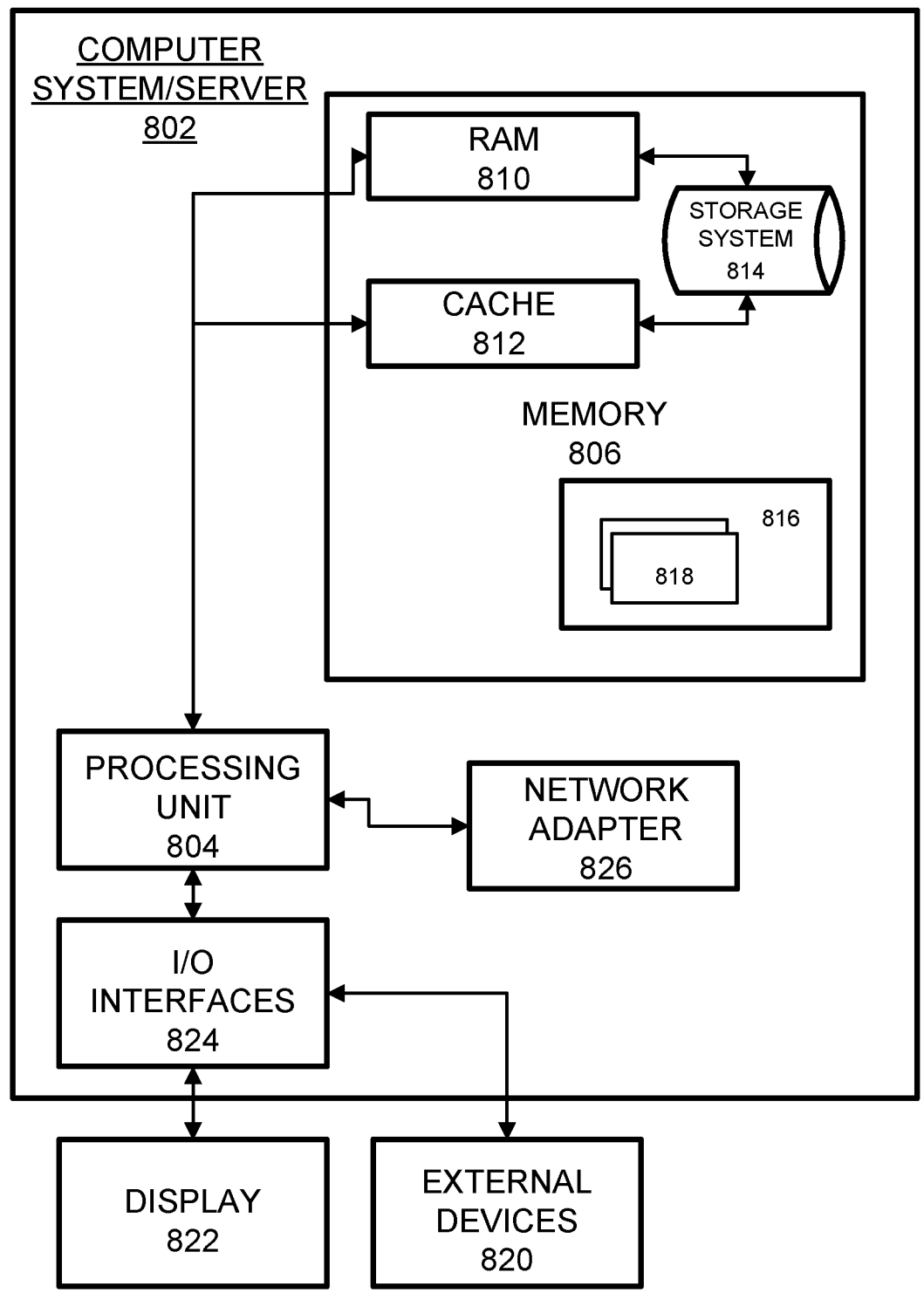
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a blockchain, of a blockchain network, configured to receive current driving state information from one or more vehicles currently in operation via a communications network; and
a processor configured to:
extract the current driving state information from the blockchain,
predict, via a machine learning algorithm that receives the current driving state information as input, that an accident event is going to occur that endangers at least one other vehicle that is currently in use,
provide an alert associated with the predicted accident event to one or more of the other vehicle and a user device of a person that is in the other vehicle, and
send the alert to the blockchain for storage in the blockchain.

2. The system of claim 1, wherein the processor is configured to apply a set of driving risk predictors to the set of states.

3. A non-transitory computer readable medium comprising one or more instructions that when executed by a processor cause the processor to perform a method comprising:
storing current driving state information received from one or more vehicles currently in operation in a blockchain of a blockchain network;
extracting the current driving state information from the blockchain;
predicting, via a machine learning algorithm that receives the current driving state information as input, that an accident event is going to occur endangering at least one other vehicle that is currently in use;
providing, via an alert indicator, an alert associated with the predicted accident event to at least one of the other vehicle and a user device of a person that is in the other vehicle; and
sending the alert to the blockchain for storage in the blockchain.

4. The non-transitory computer readable medium of claim 3, wherein the current driving state information comprises one or more of:
physical states of a driver, physical states of a vehicle, cognitive or emotional states of a driver, vehicle maintenance data of a vehicle, and recorded driving data regarding one or more of driving decisions, driving quality, and driving patterns.

5. The system of claim 1, wherein the current driving state information comprises one or more of:
physical states of a driver, physical states of a vehicle, cognitive or emotional states of a driver, vehicle maintenance data of a vehicle, and recorded driving data that describes one or more of driving decisions, driving quality, and driving patterns.

6. The system of claim 1, wherein the processor is further configured to:
determine a respective driver risk profile and vehicle use profile for each driver in a set of drivers; and
determine one of more areas of training for at least one driver in the set of drivers that is appropriate to the driver risk profile and vehicle use profile for the at least one driver.

7. The system of claim 1, wherein the processor is configured to execute an unsupervised learning algorithm on collected driving data to determine the current driving state information.

8. The system of claim 7, wherein the processor is configured to apply a supervised learning algorithm to the current driving state information to predict the accident event.

9. A method, comprising:
storing current driving state information received from one or more vehicles in a blockchain of a blockchain network;
extracting the current driving state information from the blockchain;
predicting, via a machine learning algorithm that receives the current driving state information as input, that an accident event is going to occur endangering at least one other vehicle that is currently in use;
providing, via an alert indicator, an alert associated with the predicted accident event to at least one of the other vehicle and a user device of a person that is in the other vehicle; and
sending the alert to the blockchain for storage in the blockchain.

10. The method of claim 9, wherein the predicting comprises applying a set of driving risk predictors to the current driving state information.

11. The non-transitory computer readable medium of claim 3, wherein the predicting comprises applying a set of driving risk predictors to collected driving data to determine the current driving state information.

12. The method of claim 9, wherein the predicting comprises applying a supervised learning algorithm to the current driving state information to predict the at least one accident event and the injury event.

13. The method of claim 9, wherein the current driving state information comprises one or more of:
physical states of a driver, physical states of a vehicle, cognitive or emotional states of a driver, vehicle maintenance data of a vehicle, and recorded driving data regarding one or more of driving decisions, driving quality, and driving patterns.

14. The method of claim 9, further comprising:
determining a respective driver risk profile and vehicle use profile for each driver in a set of drivers; and
determining one of more areas of training for at least one driver in the set of drivers that is appropriate to the driver risk profile and vehicle use profile for the at least one driver.

15. The method of claim 9, wherein the predicting comprises applying an unsupervised learning algorithm to collected driving data to determine the current driving state information.

* * * * *

UNITED STATES PATENT AND TRADEMARK OFFICE
CERTIFICATE OF CORRECTION

PATENT NO. : 11,021,171 B2
APPLICATION NO. : 16/153963
DATED : June 1, 2021
INVENTOR(S) : Josh Andres, John Wagner and Timothy M. Lynar It is certified that error appears in the above-identified patent and that said Letters Patent is hereby corrected as shown below:

On the Title Page

Inventor's name, Josh Andres should read:
Jorge Andres Moros Ortiz

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*